A. DOBEY.
HAY TEDDER.
APPLICATION FILED MAR. 29, 1909.
938,129.
Patented Oct. 26, 1909.
2 SHEETS—SHEET 1.
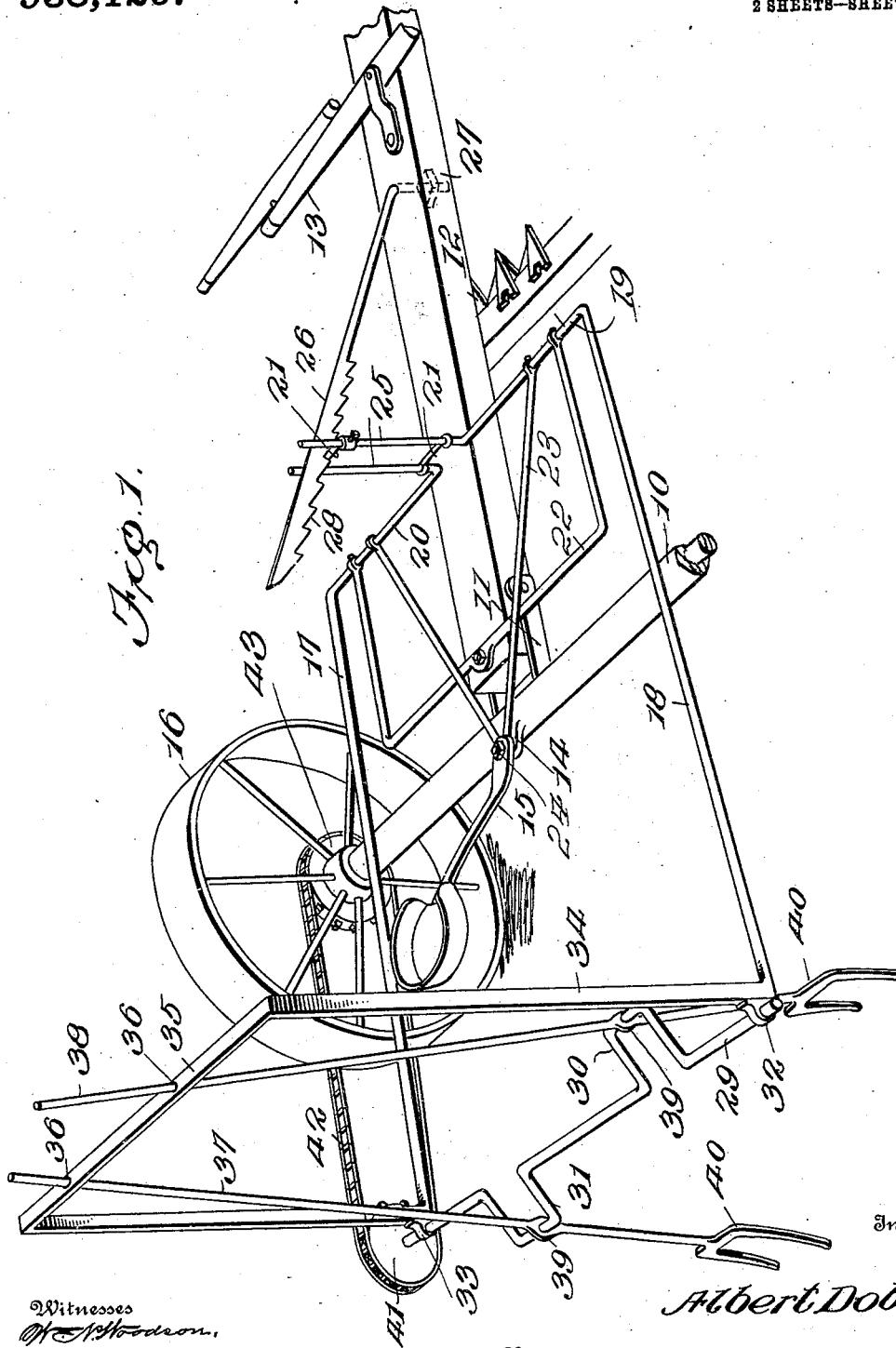
Witnesses
Inventor
Albert Dobey
By
Attorneys.

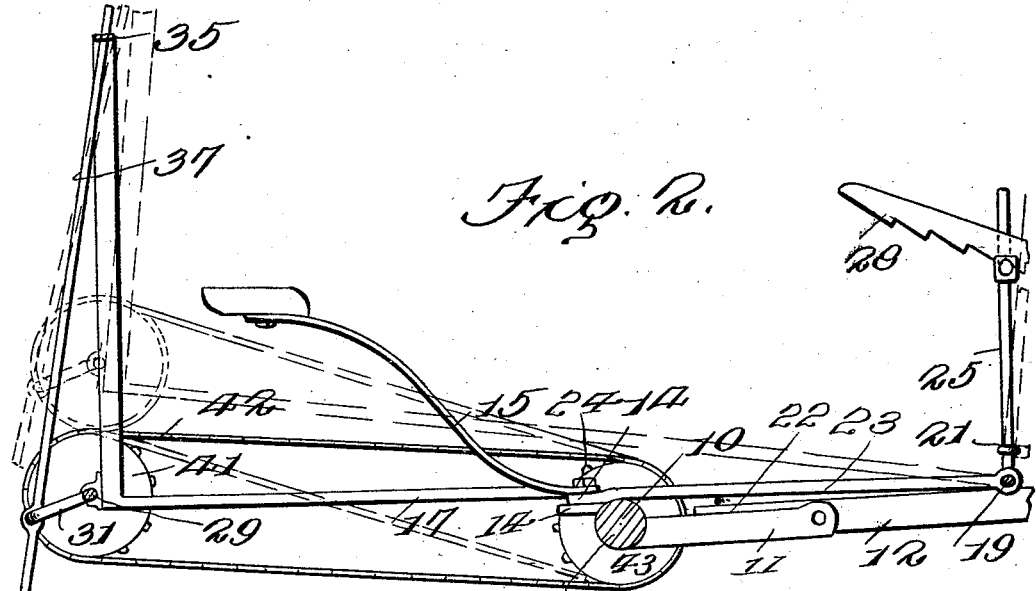
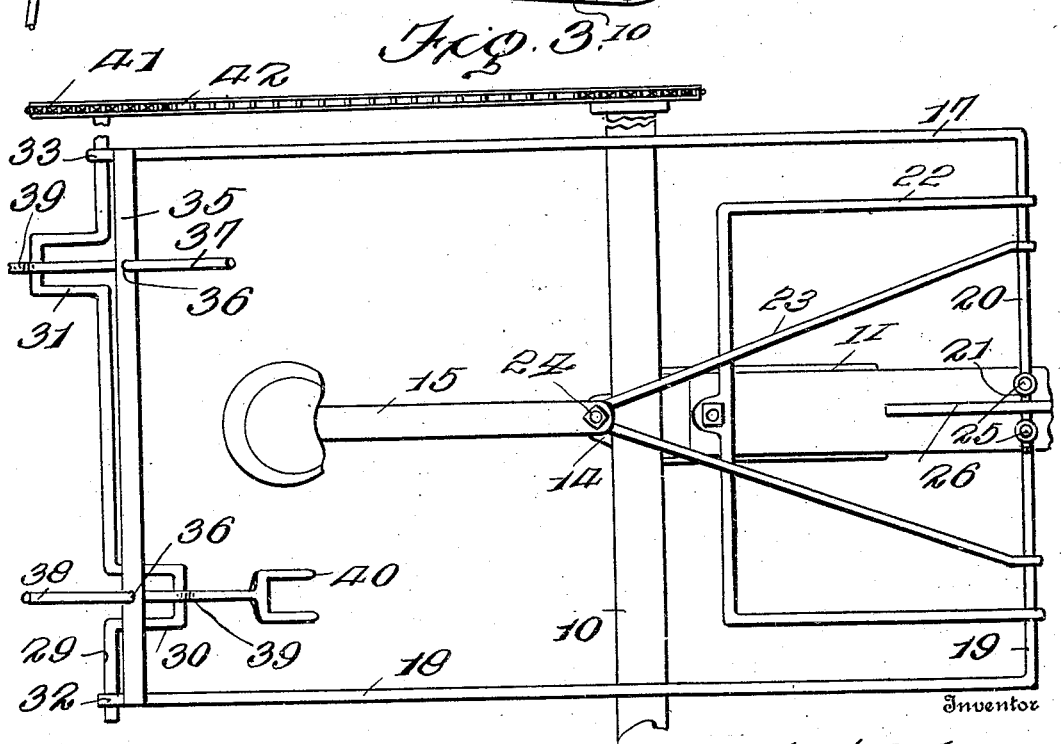

UNITED STATES PATENT OFFICE.

ALBERT DOBEY, OF TIMEWELL, ILLINOIS.

HAY-TEDDER.

938,129.  Specification of Letters Patent.  Patented Oct. 26, 1909.

Application filed March 29, 1909. Serial No. 486,480.

*To all whom it may concern:*

Be it known that I, ALBERT DOBEY, a citizen of the United States, residing at Timewell, in the county of Brown and State of Illinois, have invented certain new and useful Improvements in Hay-Tedders, of which the following is a specification.

This invention relates to farming implements and has particular reference to a hay tedder.

The invention has for an object a tedder which is adapted to be detachably mounted upon a mower or the like and which is so positioned relative thereto that the tedder forks may be adjusted vertically in order to render the dipping of the same at various angles.

The invention further provides a device of this character which is of light and simple construction so that it will not add materially to the weight of the mower or other implement to which it is applied and which will not create the tendency to raise the tongue of the mower during the operation or carrying of the same.

The invention still further designs the construction of a device which embodies the above enumerated advantages and which at the same time may be swung upwardly out of operation when it is so desired and which assumes such position that it is not cumbersome or in the way of the operative parts of the mower.

For a full understanding of the invention reference is to be had to the following description and accompanying drawings, in which:—

Figure 1 is a perspective view of the improved hay tedder as applied to a mower, the mower being shown fragmentary. Fig. 2 is a longitudinal section through the improved tedder, and Fig. 3 is a top plan view of the same, a fragmentary view of the mower being disclosed as attached to the same.

Corresponding and like parts are referred to in the following description and indicated in all the views of the drawings by the same reference characters.

Referring to the drawings in which is disclosed an embodiment of the invention as applied to a mower the numeral 10 designates the main axle sleeve of a mower of common construction which is provided with a forwardly extending lip 11 in which the tongue 12 is rigidly supported, the same being positioned intermediately of the axle sleeve 10. The tongue 12 is provided in the usual manner with a double-tree 13 through the medium of which the device is drawn. A socket 14 is rearwardly extended from the axle sleeve 10 from a central point thereof to which is attached the seat-post 15. The mower is provided with the wheels 16 for supporting and operating the same which are positioned adjacent the opposite extremities of the axle sleeve 10.

The tedder, which is the subject of this invention comprises side-bars 17 and 18 which are extended longitudinally from the mower and which are curved inwardly at their forward extremities to form cross-arms 19 and 20, the inner ends of the cross-arms 19 and 20 being extended upwardly in parallel and secured in such position by means of braces 21 secured in spaced relation across the same. The means for securing the side-bars 17 and 18 to the mower comprises a U-shaped brace 22 which is pivotally mounted at its outer ends to the cross-arms 19 and 20 adjacent the outer ends and which is intermediately secured in rigid position upon the rear extremity of the tongue 12. A V-shaped brace 23 is also employed which is pivotally secured at its outer ends to the cross-arms 19 and 20 inwardly of the outer ends of the U-shaped brace 22, the V-shaped brace 23 extending rearwardly of the brace 22 and engaged at its inner end about the bolt 24 which is engaged through the socket 14 and seat-post 15. This securing means forms a pivotal support for the side-bars 17 and 18 and causes the raising of the rear extremities of the same upon the forward movement of the parallel members 25 upwardly extended from the cross-arms 19 and 20. For the purpose of adjustably securing the side-bars 17 and 18 in position a locking bar 26 is employed which is curved downwardly at its forward extremity and engaged through the tongue 12 where it is rigidly secured in position by means of a clamping nut 27, the rear extremity of the locking bar 26 being extended rearwardly and upwardly to engage upon the upper edge of the upper brace 21. The under face of the locking brace 26 is provided with a plurality of notches or teeth 28 for engagement with the upper edge of the upper brace 21 in order to hold the parallel members 25 at the desired angle.

The tedder mechanism comprises a crank shaft 29 which is provided with two offset portions 30 and 31 which are disposed in spaced relation intermediately of the crank shaft 29, the extremities of the crank-shaft being terminated in suitable bearings 32 and 33 carried upon the rear extremities of the side-bars 17 and 18. A vertical frame 34 is upwardly extended from the rear ends of the side-bars 17 and 18 in approximate alinement with the crank shaft 29 and is provided intermediately of the cross-arm 35 thereof with vertical bearings 36 to which are reciprocally disposed the upper extremities of vibrating rods 37 and 38. The rods 37 and 38 are provided adjacent their lower ends with bushings 39 which engage about the offset portions 30 and 31 of the crank shaft 29 and through which the vibrating rods 37 and 38 are reciprocated. The lower extremities of the rods 37 and 38 are provided with suitable forks 40 to engage the hay in order to toss the same upon the vibratory rotation of the rods 37 and 38.

For actuating the crank shaft 29 a sprocket 41 is mounted at one extremity thereof adjacent the outer end of the bearing 33 over which is passed a chain 42 which extends forwardly and is engaged over a sprocket 43 mounted upon the adjacent wheel 16 in order to impart rotation thereto.

The operation of the device is as follows:—When the mower is to be conveyed to a field for operation the parallel members 25 are thrown forwardly and engaged with the teeth 28 to hold the same in such position, which arrangement disposes the rear extremities of the side-bars 17 and 18 in an upward position to raise the forks 40 from contact with the ground. When the mower is located in the field and it is desired to set the tedder attachment into operation the locking bar 26 is raised, such raising being permitted on account of the resilient qualities of the same, to release the parallel members 25 and to permit of the dropping of the forks 40. The vertical adjustment of the forks 40 is effected by the engagement of the upper brace 21 with the desired tooth 28, which adjustment is held by reason of the weight of the vertical frame and attachments thereto which is carried upon the rear extremities of the side-bars 17 and 18. As the mower is moved the wheels 16 are rotated and the sprocket 43 is set into motion. This motion is communicated through the chain 42 to the sprocket 41 and crank shaft 29, which, owing to its connection with the vibrating rods 37 and 38 through the medium of the bushing 39 causes the reciprocating motion of the forks causing the same to move backwardly in engagement with the hay and to toss the same upwardly and rearwardly of the device.

It is readily observed from this construction that an attachment is produced which comprises but few operative parts and therefore produces a device of this character which is of great practical advantage and one which may be easily maintained in order and one in which the parts may be manufactured of any desired strength to produce a durable and efficient mechanism.

Having thus described the invention what is claimed as new is:—

1. In a device as specified the combination with a mower of side-bars longitudinally disposed over the frame of said mower, cross-arms inwardly extended from the forward extremities of said side-bars, parallel members upwardly extended from the adjacent ends of said cross-arms, braces engaged across said parallel members to unite the same, a locking bar carried by said mower, teeth formed in said locking bar for engagement with the upper of said braces to retain said parallel members in adjusted position, a U-shaped brace pivotally mounted on said cross-arms and engaged centrally in rigid position with said mower, a V-shaped brace pivotally mounted on said cross-arms and rigidly secured to said mower and tedder forks reciprocally mounted between the rear extremities of said side-bars.

2. In a device as specified the combination with a mower of side-bars engaged across the upper side of said mower, cross-arms inwardly extended from the forward ends of said side-bars, braces pivotally engaged with said cross-arms and rigidly secured to said mower, parallel members upwardly extended from the adjacent ends of said cross-arms, braces carried between said parallel members, a locking bar carried by said mower and adjustably engaged with the upper of said braces on said parallel members, a crank shaft rotatably disposed across the rear extremities of said side-bars, a vertical frame upwardly extended from said side-bars above said crank shaft, vibrating rods engaged through said vertical frame and connected to said crank shaft, forks disposed on the lower ends of said vibrating rods, sprockets mounted on the end of said crank shaft and on one of said wheels of said mower, and an endless chain disposed over said sprockets to impart the rotation of said wheel to said crank shaft.

3. In a device as specified the combination with a mower, an axle sleeve carried on said mower, a socket rearwardly extended from said axle sleeve to support a seat on said mower, a lip forwardly extended from said axle sleeve and a tongue mounted on said lip of side-bars carried by said mower, cross-arms inwardly extended from the forward ends of said side-bars, a U-shaped brace pivotally disposed on said cross-arms and rigidly secured to the rear extremity of said tongue, a V-shaped brace pivotally carried by said cross-arms inwardly of said U-shaped brace, said V-shaped brace being rigidly engaged at its rear extremity to said socket, means carried by said mower for securing said side-bars in a vertical adjusted position, tedder forks carried by said side-bars and operative means disposed between said forks and said mower.

In testimony whereof I affix my signature in presence of two witnesses.

ALBERT DOBEY. [L. S.]

Witnesses:
JOHN M. DOBEY,
ORVILLE WHITESIDE.